(12) United States Patent
Hu et al.

(10) Patent No.: US 11,567,361 B2
(45) Date of Patent: Jan. 31, 2023

(54) DISPLAY MODULE AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Zuquan Hu, Beijing (CN); Peng Jiang, Beijing (CN); Ke Dai, Beijing (CN); Yue Du, Beijing (CN); Rongcheng Liu, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/279,929

(22) PCT Filed: May 19, 2020

(86) PCT No.: PCT/CN2020/091043
§ 371 (c)(1),
(2) Date: Mar. 25, 2021

(87) PCT Pub. No.: WO2020/233568
PCT Pub. Date: Nov. 26, 2020

(65) Prior Publication Data
US 2021/0397044 A1 Dec. 23, 2021

(30) Foreign Application Priority Data
May 22, 2019 (CN) .......................... 201910428023.5

(51) Int. Cl.
*G02F 1/1335* (2006.01)
*G02F 1/13357* (2006.01)
*G02F 1/139* (2006.01)

(52) U.S. Cl.
CPC ...... *G02F 1/133531* (2021.01); *G02F 1/1396* (2013.01); *G02F 1/133514* (2013.01); *G02F 1/133602* (2013.01)

(58) Field of Classification Search
CPC .................................................. G02F 1/133531
See application file for complete search history.

(56) References Cited

U.S. PATENT DOCUMENTS

2007/0258023 A1 11/2007 Huang et al.
2017/0261811 A1* 9/2017 Li ........................ H01L 27/3225
(Continued)

FOREIGN PATENT DOCUMENTS

| CN | 107065325 A | 8/2017 |
| CN | 107908053 A | 4/2018 |

(Continued)

OTHER PUBLICATIONS

International Search Report and Written Opinion for Application No. PCT/CN2020/091043, dated Aug. 8, 2020, 10 Pages.

*Primary Examiner* — Edmond C Lau
(74) *Attorney, Agent, or Firm* — Brooks Kushman P.C.

(57) ABSTRACT

The present disclosure relates to the field of display technology, and provides a display module and a display device. The display module includes a first display sub-panel, where the first display sub-panel includes: a first display sub-panel including a plurality of first pixel units; and a second display sub-panel arranged at a light-entering side of the first display sub-panel and including a plurality of second pixel units. Each second pixel unit corresponds to at least one first pixel unit, an orthogonal projection of each second pixel unit onto the first display sub-panel coincides with the corresponding first pixel unit, and the second display sub-panel is a vertical-electric-field-type liquid crystal display panel.

11 Claims, 4 Drawing Sheets

(56) References Cited

U.S. PATENT DOCUMENTS

| | | | | |
|---|---|---|---|---|
| 2018/0122832 A1* | 5/2018 | Lee | ............... | G02F 1/13624 |
| 2018/0341132 A1* | 11/2018 | Suzuki | ............ | G02F 1/133514 |
| 2019/0121193 A1* | 4/2019 | Ono | ............ | G02F 1/133603 |
| 2020/0225526 A1* | 7/2020 | Nagatani | ............ | G02F 1/1347 |
| 2021/0080767 A1 | 3/2021 | Liao et al. | | |

FOREIGN PATENT DOCUMENTS

| | | |
|---|---|---|
| CN | 107918224 A | 4/2018 |
| CN | 108227320 A | 6/2018 |
| CN | 108761888 A | 11/2018 |
| CN | 110007509 A | 7/2019 |

\* cited by examiner

DISPLAY MODULE AND DISPLAY DEVICE

CROSS-REFERENCE TO RELATED APPLICATIONS

This application is the U.S. national phase of PCT Application No. PCT/CN2020/091043, filed on May 19, 2020, which claims priority to Chinese Patent Application No. 201910428023.5, filed on May 22, 2019, which are incorporated herein by reference in their entireties.

TECHNICAL FIELD

The present disclosure relates to the field of display technology, in particular to a display module and a display device.

BACKGROUND

Color TV industry has been pursuing innovation in energy saving and image quality enhancement. With the popularization of Liquid Crystal Display (LCD) TVs, a local dimming technology is one of the best technologies for both energy saving and image quality enhancement. A display portion of the LCD TV mainly includes a backlight source and an LCD panel (Open Cell), and most of energy is consumed by the backlight source of the LCD TV. Energy saving and picture quality enhancement may be achieved through adjusting backlight brightness in various ways.

The backlight sources in the related art include an edge-type backlight source and a direct-type backlight source. In the edge-type backlight source, brightness of all LEDs may be adjusted so as to change the brightness as a whole. In the direct-type backlight source, the brightness of the LEDs may be adjusted on a regional basis, so as to adjust the brightness at each region, thereby to provide an LCD screen with high contrast (e.g., 1200:1) and reduce the energy consumption.

In order to further increase the contrast, a dual-panel display module has been proposed, where two display sub-panels are combined to display an image. One of the two display sub-panels is provided with a color filter layer for normal color display, and the other display sub-panel is not provided with any color filter layer, and it is configured to display a grayscale image. After the formation, the two display sub-panels are attached to each other, and an external circuitry is used to control the two display sub-panels to work cooperatively. The display sub-panel with the color filter layer is responsible for normal image display, and the display sub-panel without the color filter layer is responsible for a local dimming function. A pixel size of each display sub-panel is much smaller than that of a common LED, so it is able to control the backlight brightness at a region with smaller granularity through the combination of the two display sub-panels, thereby to provide higher contrast (e.g., greater than 100000:1).

However, the transmittance of the conventional dual-panel display module is relatively low.

SUMMARY

In one aspect, the present disclosure provides in some embodiments a display module, including: a first display sub-panel including a plurality of first pixel units; and a second display sub-panel arranged at a light-entering side of the first display sub-panel and including a plurality of second pixel units. Each second pixel unit corresponds to at least one first pixel unit, an orthogonal projection of each second pixel unit onto the first display sub-panel coincides with the corresponding first pixel unit, and the second display sub-panel is a vertical-electric-field-type liquid crystal display panel.

In a possible embodiment of the present disclosure, the first display sub-panel is a horizontal-electric-field-type liquid crystal display panel.

In a possible embodiment of the present disclosure, Pixels Per Inch (PPI) of the second display sub-panel are less than or equal to 150.

In a possible embodiment of the present disclosure, the display module further includes: a first polarizer arranged at a light-exiting side of the first display sub-panel; a second polarizer arranged at the light-entering side of the first display sub-panel; a third polarizer arranged at a light-exiting side of the second display sub-panel; and a fourth polarizer arranged at a light-entering side of the first display sub-panel.

In a possible embodiment of the present disclosure, a direction of an optical axis of the first polarizer is the same as a direction of an optical axis of the fourth polarizer; a direction of an optical axis of the second polarizer is the same as a direction of an optical axis of the third polarizer; and the direction of the optical axis of the first polarizer is perpendicular to the direction of the optical axis of the second polarizer.

In a possible embodiment of the present disclosure, the second polarizer is reused as the third polarizer.

In a possible embodiment of the present disclosure, the direction of the optical axis of the fourth polarizer is the same as an initial alignment direction of liquid crystals of the second display sub-panel.

In a possible embodiment of the present disclosure, the first display sub-panel is provided with a color filter layer, and the second display sub-panel is not provided with any color filter layer.

In a possible embodiment of the present disclosure, the second display sub-panel has a Twisted Nematic (TN) display mode.

In a possible embodiment of the present disclosure, the first display sub-panel has an Advanced Super Dimension Switch (ADS) or High Transmittance Advanced Super Dimension Switch (HADS) display mode.

In a possible embodiment of the present disclosure, PPI of the second display sub-panel are 100.

In another aspect, the present disclosure provides in some embodiments a display device including the above-mentioned display module.

In a possible embodiment of the present disclosure, the display device further includes a direct-type backlight source arranged at the light-entering side of the second display sub-panel.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
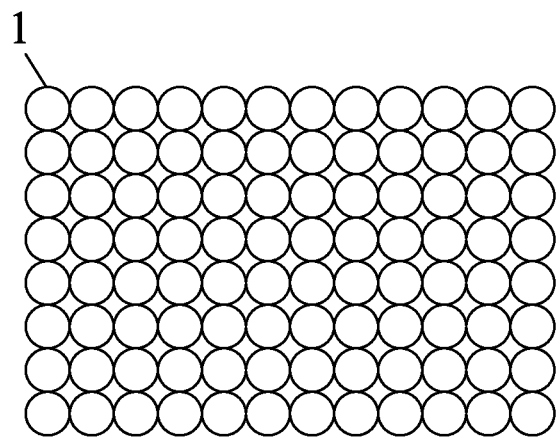
FIG. 1 is a schematic diagram of an edge-type backlight in the related art.
Figure 2:
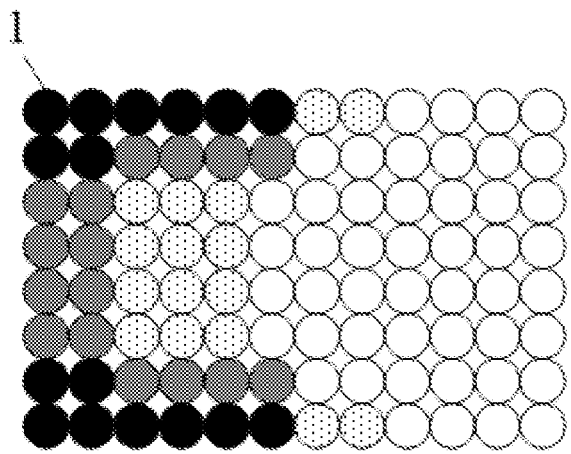
FIG. 2 is a schematic diagram of a direct-type backlight in the related art.

Color TV industry has been pursuing innovation in energy saving and image quality enhancement. With the popularization of LCD TVs, a local dimming technology is one of the best technologies for both energy saving and image quality enhancement. A display portion of the LCD TV mainly includes a backlight source and an LCD panel, and most of energy is consumed by the backlight source of the LCD TV. Energy saving and picture quality enhancement may be achieved through adjusting backlight brightness in various ways. The backlight sources in the related art include an edge-type backlight source and a direct-type backlight source. As shown in FIG. 1, in the edge-type backlight source, brightness of all LEDs is adjusted so as to change the brightness as a whole. As shown in FIG. 2, in the direct-type backlight source, the brightness of the LEDs is adjusted on a regional basis, so as to adjust the brightness at each region, thereby to provide an LCD screen with high contrast (such as 1200:1) and reduce the energy consumption.

Figure 3:
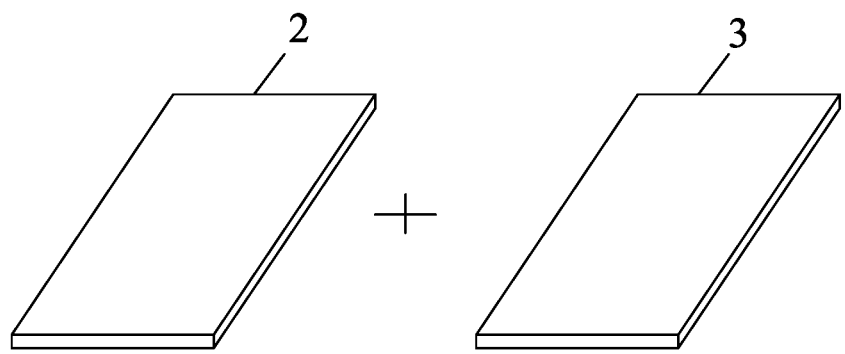
FIG. 3 is a schematic diagram of a dual-panel display module.

FIG. 3 is a schematic diagram of a dual-panel display module consisting of two display sub-panels. One is a conventional LCD panel, i.e., a first display sub-panel 2, which is called as normal cell. The first display sub-panel 2 is provided with conventional color filters in three primary colors (RGB) for normal color display. The other liquid crystal display panel, i.e., the second display sub-panel 3, is called as sub cell. The second display sub-panel 3 is not provided with any color filter in three primary colors (RGB), it is configured to display grayscale images. After the formation, the second display sub-panel 3 and the first display sub-panel 2 are attached to each other, and an external circuitry is used to control the two display sub-panels to work cooperatively. The first display sub-panel 2 is responsible for normal image display, and the second display sub-panel 3 is responsible for a local dimming function. Granularity of a controllable sub-pixel of the second display sub-panel 3 is much smaller than that of a common LED, so it is able to control the backlight brightness at a region with smaller granularity than the LED through the combination of the two display sub-panels, thereby to provide higher contrast (e.g., greater than 100000:1).

Figure 4:
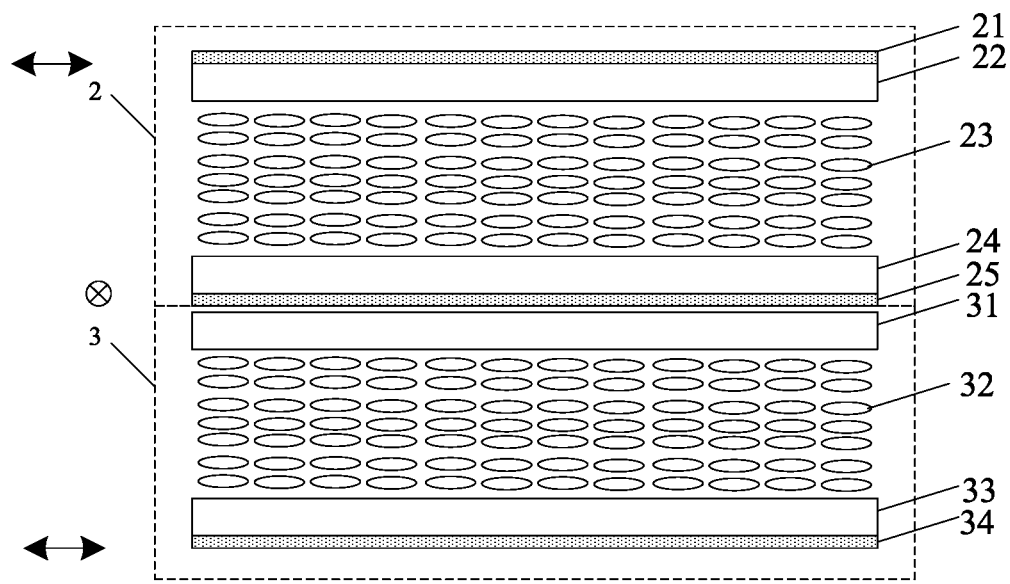
FIG. 4 is a cross-sectional view of the dual-panel display module in the related art.

FIG. 4 is a cross-sectional view of the dual-panel display module. The first display sub-panel 2 includes a first polarizer 21, a first base substrate 22, a first liquid crystal layer 23, a second base substrate 24, and a second polarizer 25. The second display sub-panel 3 includes a third polarizer, a third base substrate 31, a second liquid crystal layer 32, a fourth base substrate 33, and a fourth polarizer 34. The second polarizer 25 is reused by the third polarizer.

As shown in FIG. 4, in the conventional dual-panel display module, the second display sub-panel 3 and the first display sub-panel 2 have a same liquid crystal molecule alignment mode. For example, in FIG. 4, liquid crystal molecules in the second display sub-panel 3 and the first display sub-panel 2 are in a horizontal alignment mode (in the case that no voltage is applied to the liquid crystal molecules). A transmittance of the dual-panel display module is a product of transmittances of the second display sub-panel 3 and the first display sub-panel 2. However, the transmittance of the conventional dual-panel display module is relatively low.

An object of the present disclosure is to provide a display module and a display device, so as to increase the transmittance of the display module while providing high contrast.

The present disclosure provides in some embodiments a display module, which includes: a first display sub-panel including a plurality of first pixel units; and a second display sub-panel arranged at a light-entering side of the first display sub-panel and including a plurality of second pixel units. Each second pixel unit corresponds to at least one first pixel unit, an orthogonal projection of each second pixel unit onto the first display sub-panel coincides with the corresponding first pixel unit, and the second display sub-panel is a vertical-electric-field-type liquid crystal display panel.

Figure 8:
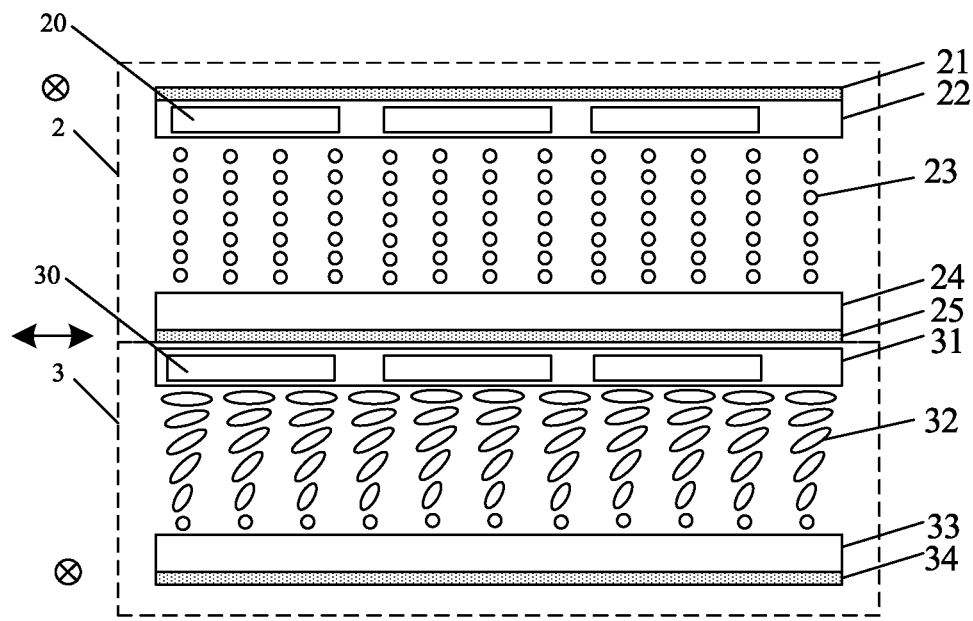
FIG. 8 is yet another cross-sectional view of the dual-panel display module according to one embodiment of the present disclosure.

FIG. 8 shows a position relationship among the pixel units. The display module includes: a first display sub-panel 2 including a plurality of first pixel units 20; and a second display sub-panel 3 arranged at a light-entering side of the first display sub-panel 2 and including a plurality of second pixel units 30. Each second pixel unit 30 corresponds to at least one first pixel unit 20, an orthogonal projection of each second pixel unit 30 onto the first display sub-panel 2 coincides with the corresponding first pixel unit 20, and the second display sub-panel 3 is a vertical-electric-field-type liquid crystal display panel.

In some embodiments of the present disclosure, the display module may include the first display sub-panel and the second display sub-panel at the light-entering side of the first display sub-panel. The second display sub-panel may be a vertical-electric-field-type liquid crystal display panel. Due to relatively high transmittance of the vertical-electric-field-type liquid crystal display panel, it is able to increase the transmittance of the dual-panel display module while providing high contrast.

In a possible embodiment of the present disclosure, the first display sub-panel may be a horizontal-electric-field-type liquid crystal display panel. Specifically, the first display sub-panel may have an ADS or HADS display mode. When the horizontal-electric-field-type liquid crystal display panel is used, it is able to provide the first display sub-panel with a wide viewing angle, thereby to enlarge a viewing angle of the display module. In addition, a data line of the liquid crystal display panel in the ADS display mode does not overlap a common electrode, and a data line of the liquid crystal display panel in the HADS display mode overlaps the common electrode, so it is able to reduce a load of the data line.

The second display sub-panel mainly aims to display a grayscale image, and in the case of low PPI, a liquid crystal display panel in a TN display mode has higher transmittance than that of the liquid crystal display panel in the ADS or HADS mode. Hence, in a possible embodiment of the present disclosure, in order to increase the transmittance of the second display sub-panel, PPI of the second display sub-panel may be less than or equal to 150, e.g., 100.

The display panel may further include: a first polarizer arranged at a light-exiting side of the first display sub-panel; a second polarizer arranged at the light-entering side of the first display sub-panel; a third polarizer arranged at a light-exiting side of the second display sub-panel; and a fourth polarizer arranged at a light-entering side of the first display sub-panel.

Further, a direction of an optical axis of the first polarizer may be the same as a direction of an optical axis of the fourth polarizer; a direction of an optical axis of the second polarizer may be the same as a direction of an optical axis of the third polarizer; and the direction of the optical axis of the first polarizer may be perpendicular to the direction of the optical axis of the second polarizer.

Further, in order to simplify a structure of the display module, the second polarizer may be reused as the third polarizer.

Further, the direction of the optical axis of the fourth polarizer may be the same as an initial alignment direction of liquid crystals of the second display sub-panel.

In the embodiments of the present disclosure, the first display sub-panel may include a color filter layer for normal color display. Since the first display sub-panel is able to perform the color display, the second display sub-panel does not need to be provided with any color filter layer, and instead, it merely needs to be display grayscale images.

The present disclosure will be described hereinafter in more details in conjunction with the drawings and specific embodiments.

Figure 5A:
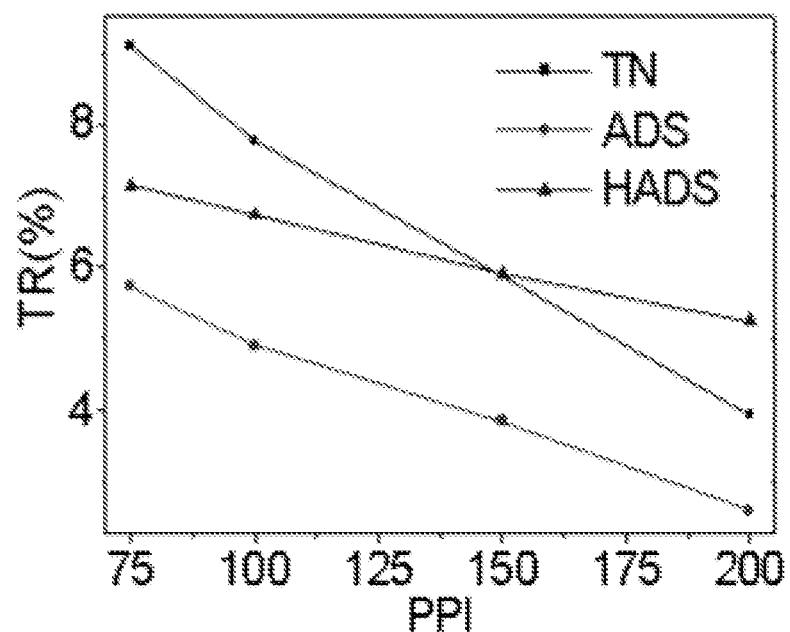
FIG. 5a is a schematic diagram of a correspondence between transmittance and PPI of a liquid crystal display panel in TN, ADS and HADS display modes.

FIG. 5a shows a correspondence between the transmittance and the PPI of the liquid crystal display panel in the TN, ADS and HADS display modes. It is found that, when the PPI are lower than 150, the transmittance of the liquid crystal display panel in the TN display mode is significantly higher than that of the liquid crystal display panel in the ADS or HADS mode. This is mainly because there is a little difference among aperture ratios of the liquid crystal display panel in the above three display modes when the PPI are low (less than 150). However, the transmittance (greater than 95%) of the liquid crystal display panel in the TN display mode is significantly higher than the transmittance (about 70%) of the liquid crystal display panel in the ADS or HADS mode.

Figure 5B:
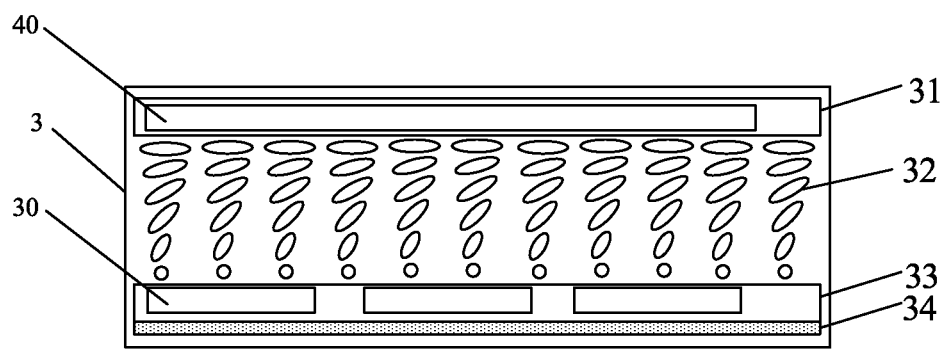
FIG. 5b is a schematic diagram of the liquid crystal display panel in the TN display mode.
Figure 5C:
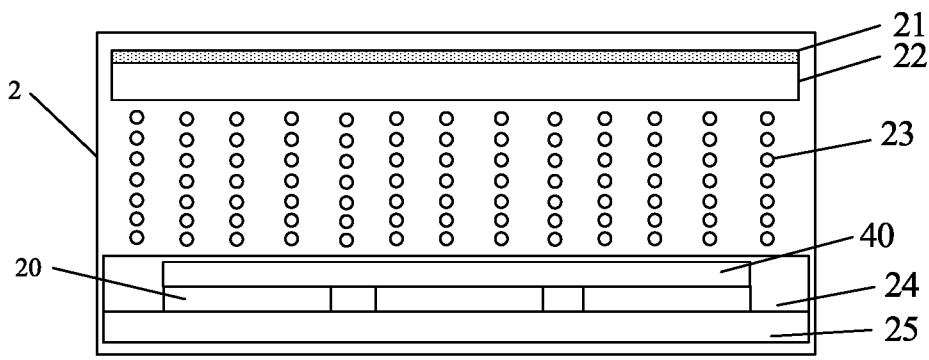
FIG. 5c is a schematic diagram of the liquid crystal display panel in the ADS and HADS display modes.

FIGS. 5b to 5c show liquid crystal display panels in TN, ADS, and HADS display modes.

As shown in FIG. 5b, the liquid crystal display panel in the TN display mode includes an array substrate 33, a color filter substrate 31, a pixel electrode 30, a common electrode 40, a second liquid crystal layer 32, and a fourth polarizer 34. The pixel electrode 30 is arranged on the array substrate 33 and the common electrode 40 is arranged on the color filter substrate 31.

As shown in FIG. 5c, the liquid crystal display panel in the ADS or HADS display mode includes an array substrate 24, a color filter substrate 22, a pixel electrode 20, a common electrode 40, a first liquid crystal layer 23, a first polarizer 21 and a base substrate 25. For the liquid crystal display panel in the HADS display mode, the pixel electrode 20 is arranged at a side of the common electrode 40 close to the base substrate 25.

Figure 6:
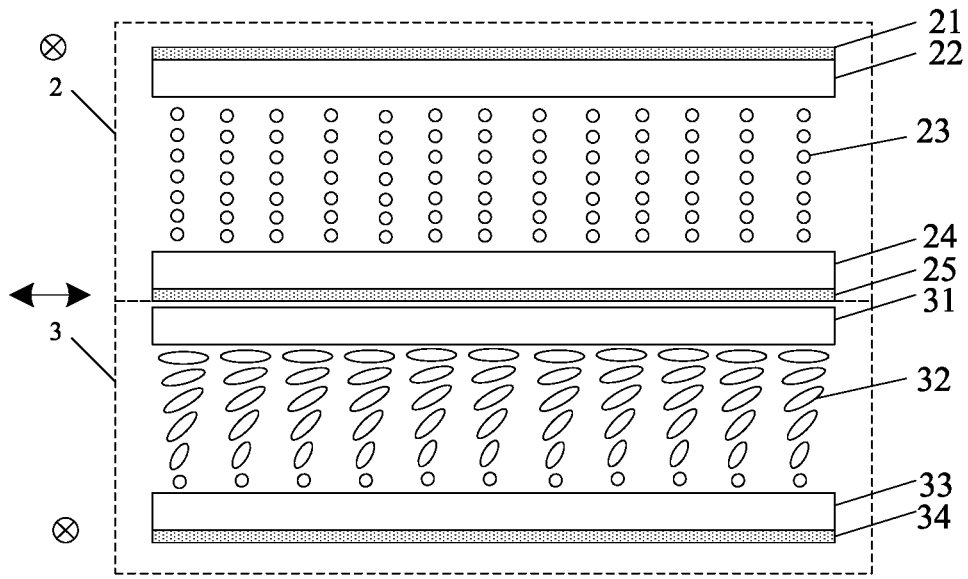
FIG. 6 is a cross-sectional view of a dual-panel display module according to one embodiment of the present disclosure.

FIG. 6 is a schematic diagram of the display module. As shown in FIG. 6, the dual-panel display module includes a first display sub-panel 2 and a second display sub-panel 3. The first display sub-panel 2 includes a first polarizer 21, a first base substrate 22, a first liquid crystal layer 23, a second base substrate 24, and a second polarizer 25, and the second display sub-panel 3 includes a third polarizer, a third base substrate 31, a second liquid crystal layer 32, a fourth base substrate 33, and a fourth polarizer 34. In order to simplify the structure of the display module and reduce a thickness of the display module, the second polarizer 25 may be reused by the third polarizer.

The first display sub-panel 2 may have an ADS or HADS display mode. The first display sub-panel 2 is used to directly display images and thereby determines a viewing angle of the display module. In order to provide a wide viewing angle, the first display sub-panel 2 may still have a conventional display mode. The second display sub-panel 3 may have a TN display mode. The second display sub-panel 3 is mainly used to display a grayscale image, the transmittance in the TN display mode is higher than that in the ADS and HADS display modes when the PPI are relatively low as shown in FIG. 5 (less than 150), so it is appropriate for the second display sub-panel 3 to be in the TN display mode. In addition, the PPI of the second display sub-panel 3 may be less than 150.

FIG. 6 shows a direction of an optical axis of each polarizer. An optical axis of a nethermost polarizer, i.e., the fourth polarizer 34, is perpendicular to a paper surface, which is the same as an initial alignment direction of the liquid crystals on the fourth base substrate 33 (in the case that no voltage is applied) when the second display sub-panel 3 has the TN display mode. In the second display sub-panel 3, due to the twisted alignment of the liquid crystal molecules, a direction of an optical axis of the second polarizer 25, i.e., an upper polarizer of the second display sub-panel, should be set as a horizontal direction. In the first display sub-panel 2, the liquid crystal molecules are arranged horizontally, and in order to achieve grayscale display, an optical axis of an upper polarizer of the first display sub-panel 2, i.e., the first polarizer 21, should be set to be perpendicular to the paper surface, which is the same as an optical axis of a lower polarizer of the second display sub-panel 3, i.e., the fourth polarizer 34. It should be appreciated that, if the display mode of the second display sub-panel 3 changes, settings of the optical axes of the polarizers in different layers may also change.

According to the dual-panel display module in the embodiments of the present disclosure, through combining the liquid crystal display panel in the ADS or HADS display mode with the liquid crystal display panel in the TN mode, it is able to not only increase the transmittance of the display module, but also provide the display module with a wide viewing angle.

The present disclosure further provides in some embodiments a display device, which includes the above-mentioned display module.

The display device may be any product or member having a display function, e.g., a TV, a display, a digital photo frame, a mobile phone, or a tablet computer.

Figure 7:
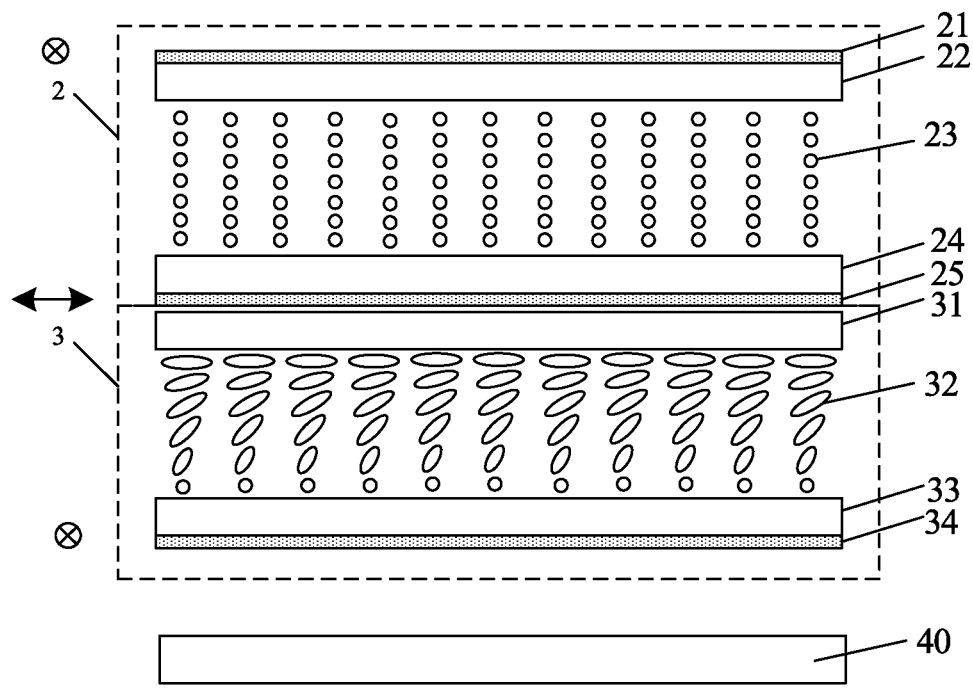
FIG. 7 is another cross-sectional view of the dual-panel display module according to one embodiment of the present disclosure.

In a possible embodiment of the present disclosure, as shown in FIG. 7, the display device may further include a direct-type backlight source 40 arranged at the light-entering side of the second display sub-panel. As compared with an edge-type backlight source, it is able to adjust the brightness of LEDs of the direct-type backlight source on a regional basis, thereby to increase contrast of the display device and reduce the energy consumption.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

The above are some embodiments of the present disclosure. The above embodiments are for illustrative purposes only, but the present disclosure is not limited thereto. Obviously, a person skilled in the art may make further modifications and improvements without departing from the principle of the present disclosure, and these modifications and improvements shall also fall within the scope of the present disclosure.

What is claimed is:

1. A display module, comprising:
    a first display sub-panel comprising a plurality of first pixel units; and
    a second display sub-panel arranged at a light-entering side of the first display sub-panel and comprising a plurality of second pixel units,
    wherein each second pixel unit corresponds to at least one first pixel unit, an orthogonal projection of each second pixel unit onto the first display sub-panel coincides with the corresponding first pixel unit, and the second display sub-panel is a vertical-electric-field-type liquid crystal display panel;
    wherein the first display sub-panel is provided with a color filter layer, and the second display sub-panel is not provided with any color filter layer;
    wherein the first display sub-panel has an Advanced Super Dimension Switch (ADS) or High Transmittance Advanced Super Dimension Switch (HADS) display mode;
    wherein the second display sub-panel has a Twisted Nematic (TN) display mode, and Pixels Per Inch (PPI) of the second display sub-panel are less than or equal to 150;
    wherein the PPI of the second display sub-panel and PPI of the first display sub-panel are set, such that a transmittance of the second display sub-panel is greater than a transmittance of the first display sub-panel.

2. The display module according to claim 1, wherein the first display sub-panel is a horizontal-electric-field-type liquid crystal display panel.

3. The display module according to claim 1, further comprising:
    a first polarizer arranged at a light-exiting side of the first display sub-panel;
    a second polarizer arranged at the light-entering side of the first display sub-panel;
    a third polarizer arranged at a light-exiting side of the second display sub-panel; and
    a fourth polarizer arranged at a light-entering side of the first display sub-panel.

4. The display module according to claim 3, wherein a direction of an optical axis of the first polarizer is the same as a direction of an optical axis of the fourth polarizer; a direction of an optical axis of the second polarizer is the same as a direction of an optical axis of the third polarizer; and the direction of the optical axis of the first polarizer is perpendicular to the direction of the optical axis of the second polarizer.

5. The display module according to claim 3, wherein the second polarizer is reused as the third polarizer.

6. The display module according to claim 3, wherein the direction of the optical axis of the fourth polarizer is the same as an initial alignment direction of liquid crystals of the second display sub-panel.

7. The display module according to claim 1, wherein PPI of the second display sub-panel are 100.

8. A display device, comprising the display module according to claim 1.

9. The display device according to claim 8, further comprising a direct-type backlight source arranged at the light-entering side of the second display sub-panel.

10. The display module according to claim 1, wherein a transmittance for liquid crystal molecules in the second display sub-panel is greater than a transmittance for liquid crystal molecules in the first display sub-panel.

11. The display module according to claim 1, wherein a transmittance for liquid crystal molecules in the second display sub-panel is greater than 95%.

* * * * *